Figure 3:
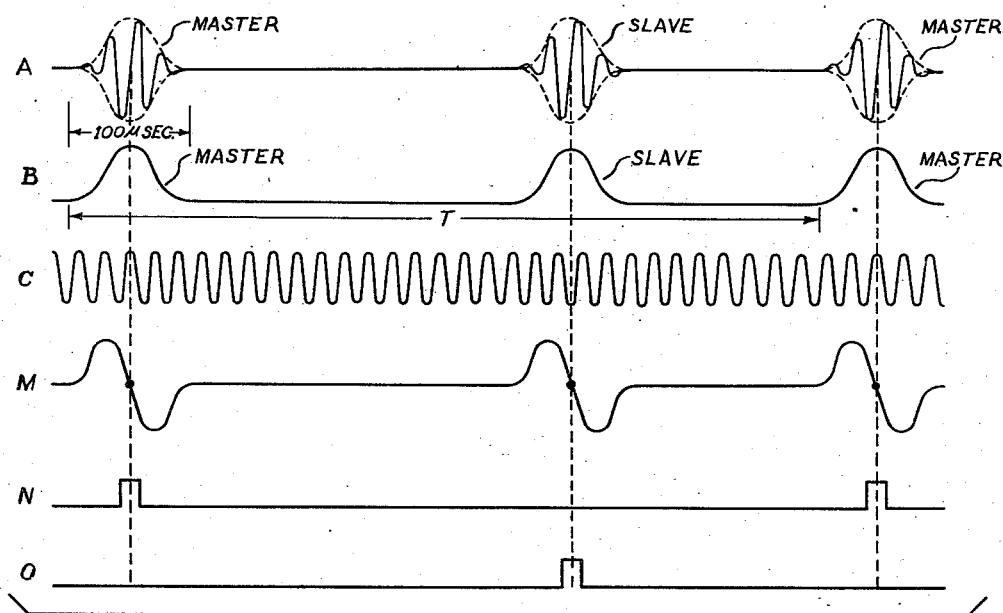

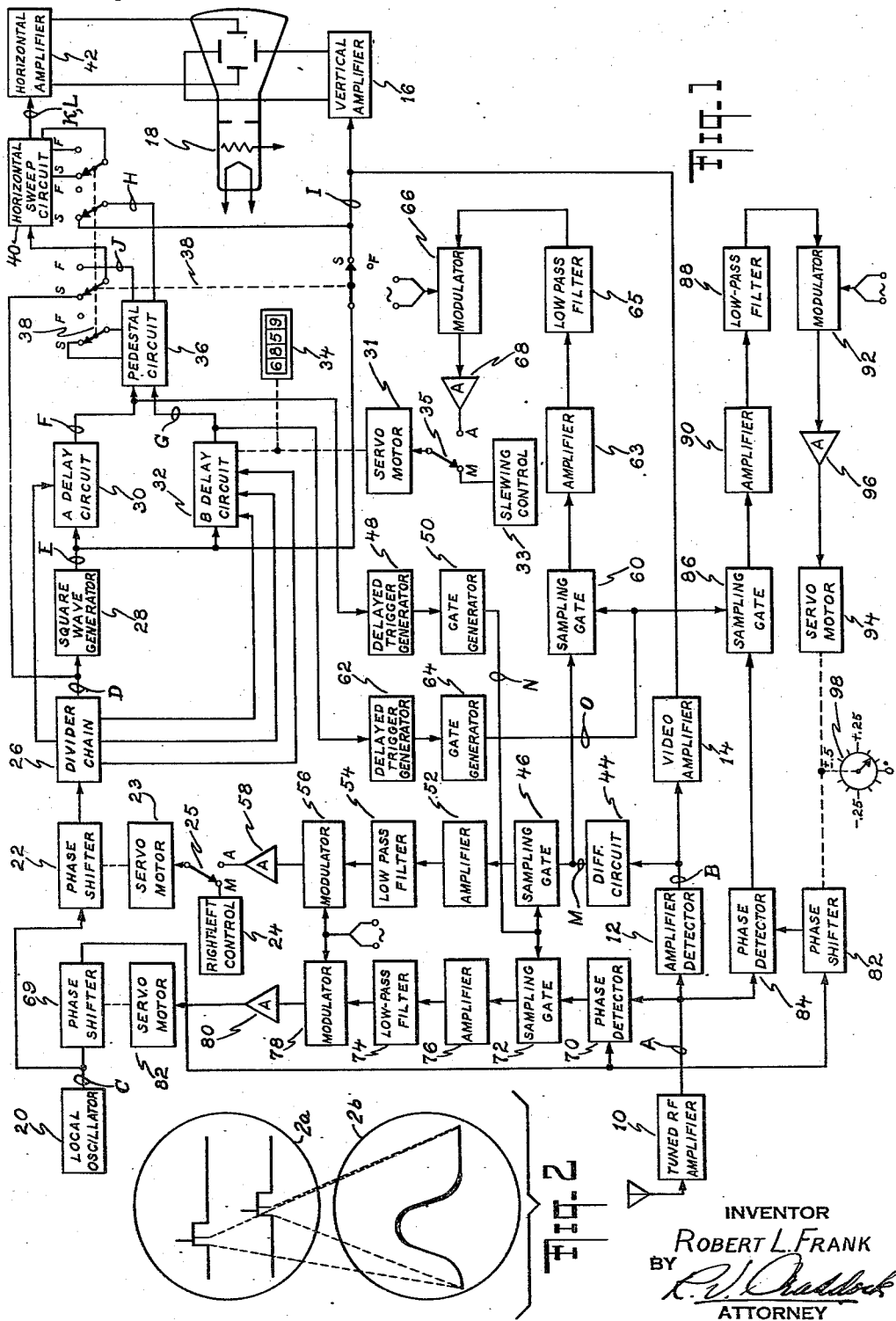

2,811,718

AUTOMATIC TRACKING LORAN RECEIVER

Robert L. Frank, Great Neck, N. Y., assignor to Sperry Rand Corporation, a corporation of Delaware Application April 6, 1956, Serial No. 577,187

10 Claims. (Cl. 343—103)

This invention relates to hyperbolic radio navigation systems, and more particularly is concerned with a loran type receiver which automatically indicates with greater accuracy the time difference between received master and slave pulses.

Radio navigational systems of the pulsed hyperbolic type, known as loran, locate the position of a craft on a hyperbolic line of position. This line is determined by a receiver on the craft which measures the difference in travel time of two pulsed radio signals which are transmitted from known locations. Knowing the velocity of radio waves, the difference in travel time can be converted to a difference in distance from the two known locations. The difference in distance determines the hyperbolic line of position.

Automatic loran receivers have heretofore been proposed for automatically and continuously indicating the time difference between the master and slave pulses. Such automatic receivers generally employ a pulse matching technique in which a local trigger is generated in synchronism with a point on the leading edge of a received master pulse. The trigger is then delayed and synchronized with the corresponding point on the leading edge of the received slave pulse, the amount of delay being a measure of the time difference between the master and slave pulses. The accuracy of such systems depends on the accuracy with which the local triggers can be synchronized with the received pulses, which in turn depends upon how well corresponding points on the received pulses can be identified. The sharper the rise time of the pulses the more accurately such systems can be made to operate. In standard loran systems which operate at frequencies near 1850 kc. with a pulse duration of approximately 40 microseconds, a pulse rise time of 15 microseconds permits time difference measurements within 1 or 2 microseconds of the correct value by the pulse envelope matching technique.

However, in an effort to extend groundwave coverage, to simplify operation, and obtain higher accuracy, low frequency loran systems have been set up which operate at an allocated frequency of 100 kc. Due to bandwidth limitations to prevent possible interference with other services, the rise time of the pulses in the low frequency loran system is held to not less than 50 microseconds. The accuracy of pulse matching is therefore considerably reduced in the low frequency loran systems.

For this reason, a cycle matching technique of measuring the time difference between master and slave signals has been proposed. In this technique the R.-F. cycles of the incoming waves are superimposed or matched on an oscilloscope screen. Cycle matching improves the accuracy of time measurement since a point on a cycle, such as the zero cross-over point, can be determined with much greater precision than a point on the pulse envelope. This is evident from the fact that the slope of the cycle on passing through the zero cross-over point must necessarily be much steeper than the slope of the envelope of the pulse which contains the cycle.

Cycle matching only gives a time measurement in a fraction of a cycle, but the number of whole cycles difference in distance is ambiguous, that is, a cyclic ambiguity exists in a cycle matching system, which ambiguity must be resolved by other means. One automatic low frequency loran receiver utilizing cycle matching is described in copending application Serial No. 575,475 filed March 28, 1956, in the name of Winslow Palmer. This system uses the cross-over point of one of the R.-F. cycles to identify accurately a particular point on the leading edge of a received pulse, the time measurement being roughly determined by a pulse matching technique. One limitation of such an automatic receiver system as therein described is that the phase relationship between the carrier and the pulse envelope of the transmitted pulses must have a fixed predetermined value. While this is not particularly difficult to achieve at the transmitting stations, various factors encountered in transmission tend to modify the relationship between the pulse envelope and the carrier cycles which have the effect of altering the apparent phase relationship between the cycles and pulse envelope of signals at the receiver. Such factors include the greater attenuation of the upper side band frequencies in over-land transmission and also delay effects in the selective receiver circuits.

It is the general object of the present invention to provide a loran type receiver which automatically and continuously indicates the time difference between received master and slave pulses.

Another object of this invention is the provision of automatic loran receiving apparatus which utilizes cycle matching to achieve maximum accuracy.

Another object of this invention is thep rovision of an automatic loran receiver which is particularly adapted for operation with a long range low-frequency loran system.

Another object of this invention is to provide an automatic loran receiver using cycle matching techniques in which cyclic ambiguity is resolved by pulse matching techniques.

Another object of this invention is the provision of an automatic loran receiver which utilizes cycle matching time measurement techniques and resolves cyclic ambiguities in such time measurements without resorting to information in the transmitted signals in the form of a predetermined phase relationship between the carrier and the envelope of the transmitted pulses.

These and other objects of the invention which will become apparent as the description proceeds are achieved by the provision of a loran receiver responsive to transmitted master and slave pulses including a first servo loop for maintaining first locally generated triggers coincident with a predetermined point on the envelope of the received master pulses, and a second servo loop including variable time delay means to delay the first triggers for generating delayed triggers coincident with the corresponding point on the envelope of the slave pulses. The time delay means includes an indicator for showing the amount of delay to an accuracy of less than the period of one cycle of the carrier.

A third servo loop is provided for maintaining a locally generated C.-W. signal, at substantially the frequency of the carrier, phase coherent with the carrier of the master pulses. A fourth servo loop is provided including a variable phase shifter coupled to the C.-W. signal for providing a phase shifted output that is phase coherent with the carrier of the received slave pulses. The phase shifter includes an indicator for showing the relative phase between the received master and slave carrier isgnals.

Figure 4:
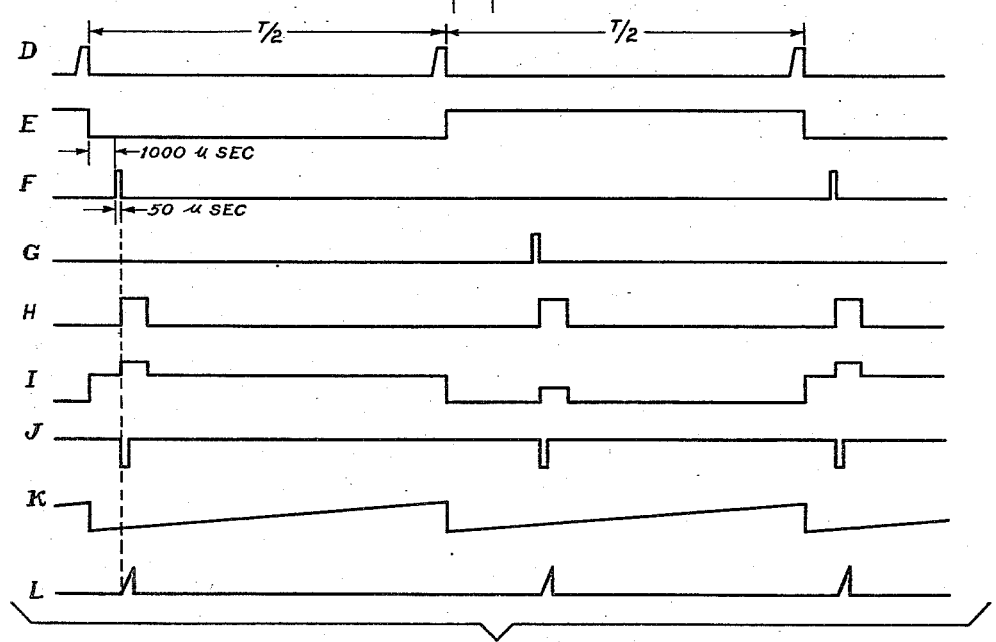

For a better understanding of the invention reference should be had to the accompanying drawings, wherein:

Fig. 1 is a block diagram of an embodiment of the present invention;

Fig. 2a–b show the wave forms appearing on the indicator tube of the receiver of Fig. 1; and Figs. 3 and 4 show a series waveforms of signals present in the receiver of Fig. 1.

In a low-frequency loran system, master and slave transmitting stations are provided, the master station transmitting pulsed carrier signals at a predetermined repetition rate at a carrier frequency such as 100 kc. The slave station, located at a point remote from the master station, transmits pulsed carrier signals at the same repetition rate as the master pulses. The pulse envelope as well as the carrier of the slave signals are synchronized respectively with the pulse envelope and carrier of the master signals. It is general practice in loran to delay the output of the slave station by a half repetition interval plus an additional delay time for purposes of identifying the master and slave pulses at the receiver. Systems for synchronizing the slave station to the master station are well known in the art, see for example, application Serial No. 195,239, filed November 13, 1950, in the name of Robert L. Frank.

Referring to the automatic loran receiver of the invention as shown in Fig. 1, the numeral 10 indicates generally a tuned radio frequency amplifier for amplifying the received master and slave pulsed carrier signals. The output from the R.-F. amplifier 10, as shown in Fig. 3a, includes the pulsed carrier master and slave pulses having a time relation determined by the delay between master and slave signals at the transmitters and the relative position of the receiver. The output of the amplifier 10 is fed to an amplitude detector 12 which derives the envelope of the received master and slave pulses, the output of the detector 12 having a waveform shown in Fig. 3b. In order to operate the receiver of the present invention automatically, it is necessary that the receiver be first manually adjusted in the manner of a standard loran receiver to achieve a substantial pulse match. To this end, the output of the detector 12 is amplified by a suitable video amplifier 14 and coupled through a vertical amplifier 16 to the vertical deflection plates of a cathode ray tube indicator, shown generally at 18. A local oscillator 20, which is preferably crystal-controlled to stabilize the oscillator at substantially the carrier of the master and slave signals, is provided at the receiver. The output of the oscillator is coupled through a variable phase shifter 22, which is operated by an A.-C. servomotor 23, to the input of a divider chain 26. The servomotor 23 is controlled during the manual pulse matching phase of operation by a right-left slewing control 24 through a switch 25 set in its manual control position, designated M. The right-left slewing control provides a manual control of the servomotor 23 to rotate the phase shifter at a constant speed in one direction or the other.

The divider chain 26 consists of a plurality of conventional blocking oscillator type dividers by which the input signal is divided in frequency down to a frequency of twice the pulse repetition rate of the master pulses. The output of the divider chain 26, therefore, is a chain of trigger pulses occurring at twice the repetition rate of the received master pulses, as shown in Fig. 4d.

The output triggers from the divider chain 26 are coupled to a square-wave generator which consists of a conventional Eccles-Jordan circuit. The square-wave generator 28 produces a square wave output in response to the triggers from the divider chain 26, the square wave having the same frequency as the pulse repetition rate of the master pulses. The waveform of the square-wave generator output is shown in Fig. 4e.

The output of the square-wave generator 28 is coupled to an A delay circuit 30 which produces a delayed square trigger pulse, as shown in Fig. 4f, the leading edge of which is delayed, for example, 1000 microseconds after the start of the negative portion of the square wave at the output of the square-wave generator 28. The trailing edge of the delayed pulse from the A delay circuit 30 occurs 50 microseconds later and is preferably controlled by pulses derived from the divider chain 26. The divider chain 26, square-wave generator 28, and A delay circuit 30 are the same as taught in Patent No. 2,651,033 by W. P. Frantz which describes in detail a standard loran receiver.

The output from the square-wave generator 28 is also coupled to a B delay circuit 32. The B delay circuit is preferably of a type described in Patent No. 2,621,238 by Winslow Palmer which produces a variable delay in response to the variations in a shaft input. The function of the B delay circuit 32 is to produce recurrent variably delayed output pulses of recurrence interval equal to the recurrence interval of the square wave from the generator 28. The output of the pulses from the B delay circuit are delayed with respect to the recurrent output pulses from the A delay circuit by an adjustable amount that is accurately indicated on a counter 34. The output signal from the B delay circuit is shown in Fig. 4g. The B delay circuit is operated by an A.-C. servomotor 31, which in the manual phase of operation, is controlled by a slewing control 33 through a switch 35. The slewing control 33 actuates the servomotor in either direction so that the delay of the B delay circuit 32 may be selectively increased or decreased as desired.

The outputs of the A delay circuit and the B delay circuit are fed to a pedestal circuit 36 that generates a square pedestal pulse in response to the trigger pulses from the A delay circuit and the B delay circuit. These pedestal pulses, as shown in Fig. 4h, are combined with the output of the square-wave generator 28 and fed to the vertical amplifier 16. The waveform of the combined square wave and pedestal pulses is shown in Fig. 4i.

The horizontal sweep control for the cathode ray indicator 18 includes a slow sweep and a fast sweep as determined by a manually operated switch, indicated at 38. During the slow sweep phase of operation, the switch 33 connects the trigger pulses from the divider chain 26 to a horizontal sweep circuit 40 which generates a sawtooth wave (the waveform of which is shown in Fig. 4k) synchronized with the trigger pulses from the divider chain 26. The sawtooth wave therefore has a repetition rate exactly twice the loran pulse repetition rate. The output of the horizontal sweep circuit 40 is amplified in a suitable horizontal amplifier 42 and applied to the horizontal deflection plates of the indicator tube 18. The pedestal circuit and horizontal sweep circuit are the same as provided in a conventional loran receiver as described in the above mentioned Patent No. 2,651,033.

The switch 38 when set for a slow sweep sets the pedestal circuit 36 to generate a long pedestal pulse, for example, of the order of 1300 microseconds, which is connected by the switch 38 to the vertical amplifier 16. The switch 38 also connects the output of the square-wave generator 28 to the vertical amplifier 16 only during the slow sweep phase of operation. The resulting indication on the cathode ray tube screen is shown in Fig. 2a. The square-wave signal derived from the square-wave generator 28 deflects the beam up and down during successive horizontal sweeps so that two traces are produced on the cathode ray tube screen. The pedestal on the upper trace is fixed in position by the A delay circuit 30 and the position of the pedestal on the lower trace is shifted in response to variations in delay produced by the B delay circuit 32.

In the fast sweep mode of operation, the switch 38 connects a trigger pulse from the pedestal circuit 36 to the input of the horizontal sweep circuit 40 and at the same time changes the rise time of the sawtooth wave generated by the horizontal sweep circuit. Thus in the fast sweep position of the switch 38, the horizontal sweep circuit is synchronized with the pulses from the pedestal circuit 36, the waveform of which is shown in Fig. 4j, and the rise time of the sawtooth wave is greatly increased, producing an output from the horizontal sweep circuit having the waveform shown in Fig. 4l. At the same time the switch 38 disconnects the output of the pedestal circuit 36 from the vertical amplifier 16 and also disconnects the output of the square-wave generator 28 from the vertical amplifier 16, so that the vertical control of the indicator 18 responds only to the received master and slave pulse envelopes derived from the amplitude detector 12 and amplifier 14. The resulting indication on the cathode ray tube indicator 18 during fast sweep is shown in Fig. 2b.

The circuit as thus far described is substantially the same as in well known standard loran receivers, and the operation of the circuit is substantially identical to the operation of the standard loran receiver, except that the usual intermediate sweep frequency has been eliminated. It has been found from practice that the operator with some skill can go directly from a slow sweep to a fast sweep in matching pulse envelopes on the cathode ray tube indicator. Thus in operation, the operator adjusts the right-left control 24 to slew the servo motor 23 and vary the phase shifter 22 so that the time relationship between the received master pulses and the pedestal may be varied. The effect on the face of the cathode ray scope is to move the master pulse indication to the right or to the left, so that it can be positioned adjacent the leading edge of the pedestal on the upper horizontal sweep. The B delay circuit 32 is then varied by means of the slewing control 33 and the servo motor 31 to move the pedestal on the lower sweep of the cathode ray tube screen under the slave pulse, the slave pulse being positioned adjacent the leading edge of the pedestal on the lower sweep, as shown in Fig. 2a.

The fast sweep switch 38 is then set for operation and a fine adjustment of the B delay circuit by the slewing control 33 is made to bring the leading edge of the master and slave pulses into coincidence on the indicator screen, as shown in Fig. 2b. Once a pulse match is made in the manner above described, automatic operation of the receiver, as hereinafter described may be initiated by throwing the switches 25 and 35 to the automatic position.

Automatic control, including cycle matching, is achieved in the following manner. The output of the amplitude detector 12 is fed to a differentiating circuit 44 which differentiates the pulse envelope to produce a zero cross-over point corresponding to the point of maximum amplitude of the received pulses. The differentiated waveform is shown in Fig. 3m. The output of the differentiating circuit 44 is coupled to a sampling gate 46 which is triggered open in response to the output pulses from the A delay circuit 30 by a trigger generator 48 which delays the opening of the sampling gate 46 a predetermined time after the occurrence of the output pulse from the A delay circuit 30, and a gate generator 50 which controls the closing of the sampling gate 46 after a desired time interval. The trigger generator 48 and the gate generator 50 may be conventional monostable multivibrators, for example. The monostable multivibrator of the gate generator 50 is triggered in response to the trailing edge of the square pulse produced by the monostable multivibrator 48. The recovery times of the monostable multivibrators 48 and 50 are arranged such that the sampling gate 46 is open for a time equal to or less than the differentiated pulse duration and at a time in substantial coincidence with the zero cross-over point of the differentiated master pulses, when the circuit has been manually adjusted to provide a match between the master and slave pulses on the cathode ray tube indicator 18.

The output from the sampling gate 46 is amplified by an amplifier 52 and coupled to a low-pass filter 54 which is arranged to block frequencies at the loran pulse repetition rate but pass the D.-C. component of the output from the sampling gate 46. The output of the low-pass filter 54 therefore is a D.-C. error signal which varies with the variations in the time of occurrence of the gating pulses from the gate generator 50 and the time of occurrence of the zero cross-over point of the derived master pulse envelope from the differentiating circuit 44. This error signal is modulated by a suitable modulator circuit 56 connected to a 400-cycle modulating source, amplified by a suitable power amplifier 58, and applied to the servomotor 23 through the switch 25 for controlling the phase shifter 22.

In operation it will be seen that the sampling gate 46 acts as a coincidence detector for a first servo loop including the phase shifter 22, divider 26, and A delay circuit 30, the output of the sampling gate 46 controlling the servomotor 23 and phase shifter 22 to maintain the output from the A delay circuit 30 in a fixed time relation with the peak of the master pulses.

A second servo loop for controlling the B delay circuit 32 includes a sampling gate 60 coupled to the output of the differentiating circuit 44, the sampling gate 60 being gated open in response to the output of the B delay circuit 32 by means of a trigger generator 62 and a gate generator 64, similar respectively to the trigger generator 48 and the gate generator 50 described above. The delayed trigger generator 62 and the gate generator 64 are arranged to open the sampling gate 60 in response to an output pulse from the B delay circuit 32 in substantial coincidence with the zero cross-over point of the derived envelope of the slave pulses from the amplitude detector 12, the waveform of the gating pulse from gate generator 64 being shown in Fig. 3o. The delay in the trigger generator 62 is made to be identical to the delay in trigger generator 48. The sampling gate 60 functions in the same manner as the sampling gate 46, namely, as a coincidence detector between the gating pulse derived from the B delay circuit 32 and the differentiated envelope of the received slave pulses.

The output of the sampling gate 60 is amplified by an amplifier 63 and passed through a low-pass filter 65 which blocks all but the D.-C. component of the sampling gate output. The D.-C. signal from the low-pass filter is applied to a suitable modulator 66 and coupled to the servomotor 31 through a power amplifier 68.

The second servo loop including the sampling gate 60 acts to control the B delay circuit 32 to maintain a fixed time relationship between the output pulses from the B delay circuit and the received slave pulses. In adjusting the B delay circuit 32, the second servo loop continually corrects the reading on the indicator 34 as the time difference between the received master and slave pulses varies with changes in position of the receiver relative to the master and slave transmitting stations.

As mentioned above, because of limitations in the accuracy of pulse matching, the time indication on the indicator 34 has an error factor, which may be as much as ±3 or 4 microseconds. To provide increased accuracy, cycle matching is employed in the receiver to provide a phase measurement between the carriers of the received master and slave pulses. Cycle matching to provide a phase measurement is achieved in the following manner.

The output of the tuned R.-F. amplifier 10 and the output of a variable phase shifter 69 connected to the local oscillator 20 are coupled to a phase detector 70. The phase detector 70 may be a conventional type adapted to produce a voltage proportional to the cosine of the phase angle between the two signals which are compared. The output of the phase detector 70 is coupled to a sampling gate 72 which is similar to the sampling gate 46 described above and which is also triggered by the output of the gate generator 50 in response to the output pulses from the A delay circuit 30. The output of the sampling gate 72 is coupled to a low-pass filter 74 through a suitable amplifier 76, the low-pass filter 74 being designed to pass only the D.-C. component of the sampling gate output. Thus the output of the low-pass filter 74 is a D.-C. error signal proportional to the relative phase between the R.-F. carrier of the received master pulses and the C.-W. signal at the output of the phase shifter 22.

This error signal is applied to a suitable modulator 78 and power amplifier 80 and to an A.-C. servomotor 82 which controls the variable phase shifter 69. It will be seen that a third servo loop is thus provided including the phase detector 70 for controlling the phase shifter 69 to maintain the output signal from the phase detector 69 in phase quadrature with respect to the carrier of the received master pulses. Such a servo loop for maintaining phase coherence between a reference C.-W. signal and a pulsed carrier signal is described in detail in copending applications Serial No. 92,797 filed May 12, 1949, in the name of Winslow Palmer, and Serial No. 91,659 filed May 6, 1949, in the name of Philip W. Crist, the latter of which describes in detail a sampling gate circuit suitable for use in the sampling gates in the present invention.

The phase coherent C.-W. signal from the phase shifter 69 is coupled through another variable phase shifter 82 to a phase detector 84, similar to the phase detector 70. The phase detector 84 is also coupled to the output of the tuned R.-F. amplifier 10. The output of phase detector 84 is a voltage proportional to the cosine of the phase angle between the carrier of the received slave signals and the output of the phase shifter 82.

The output of the phase detector 84 is coupled to a sampling gate 86 which is triggered open by the output of the gate generator 64 in response to the triggers from the B delay circuit 32, so that the sampling gate samples the output of the phase detector only during the time of reception of a slave pulse. The output of the sampling gate 86 is coupled to a low-pass filter 88 through an amplifier 90, the low-pass filter 88 again being arranged to pass only the D.-C. component of the sampling gate output, so that the output of the low-pass filter is a D.-C. error signal which varies in magnitude and polarity in response to the phase relationship between the output of phase shifter 82 and the carrier of the received slave pulses.

This output error signal from the low-pass filter 88 is modulated in a suitable modulator circuit 92 and coupled to an A.-C. servomotor 94 through a power amplifier 96. The servomotor 94 actuates the phase shifter 82 in response to the error signal from the low-pass filter 88 so as to bring the output of the phase shifter 82 into phase quadrature with the carrier of the received slave pulses. The amount of phase shift introduced by the phase shifter 82 is therefore a measure of the phase difference between the carrier of the received master pulses and the carrier of the received slave pulses. A suitable dial indicator 98 driven in unison with the phase shifter 82 by the servomotor 94 provides an indication of the relative phase shift between the received master and slave carriers. One complete revolution of the indicator 96 corresponds to a 360° phase shift which in turn corresponds to one cycle at the carrier frequency, or a time difference of 10 microseconds where the carrier frequency is 100 kilocycles.

From the above description it will be seen that the various objects of the invention have been achieved by providing a loran receiver that automatically tracks changes in the time difference between received master and slave loran pulses. A pulse match is made manually by means of a cathode ray tube indicator and then the receiver is switched to automatic operation wherein the pulse matching and cycle matching servos track the received master and slave pulses.

A rough measurement of the time difference between the received master and slave pulses is made by the pulse matching servos which control the indicator 34. This measurement is accurate within a time difference equal to one cycle at the carrier frequency, i. e., 10 microseconds. A fine measurement of time difference between the received master and slave carriers is made by the cycle matching servos which control the indicator 98. This measurement is a more accurate measurement in terms of fractions of a cycle time difference between the master and slave signals but is ambiguous as to the number of whole cycles time difference. The two indications together, however, give a complete and accurate time difference measurement. The indicator 34 may be calibrated to give the nearest number of whole cycles time difference and the indicator 98 may be calibrated to give the fraction of a cycle in the time difference. Thus if the indicator 34 shows 6459.0 and the indicator 98 shows .75, the number of cycles time difference at the carrier frequency is 6458.75 cycles, or 64587.5 microseconds time difference.

It will be noted that the cycle matching servos and the pulse matching servos are independent and therefore do not depend on any fixed phase relationship existing between the carrier and the pulse envelope. The only requirement on the system is that the master and slave carriers be synchronized so as to have a fixed phase relationship at the slave transmitter, and that the pulse envelopes also be synchronized at the slave transmitter. The present system, designated a free-phase system, in contrast to that described in the above copending application of Winslow Palmer which is designated a fixed-phase system, is characterized by the fact that the pulse matching and cycle matching use independently controlled local C.-W. sources, namely, the output of the phase shifter 22 and the output of the phase shifter 69.

While the present circuit is shown with a single oscillator with variable phase shifters providing independently controllable C.-W. signal sources, it will be appreciated that two oscillators may be used with separate frequency control of each provided by the respective servo loops.

Also, since the master and slave signals are always spaced in time at the receiver, time sharing of many of the circuit elements can be accomplished if desired. For example, a single sampling gate may be used on a time sharing basis for both the first and second servo loops. Similarly a single phase detector and sampling gate may be used on a time sharing basis for the third and fourth servo loops, in the manner taught in copending U. S. application Serial No. 231,626 filed June 14, 1951, in the name of Robert L. Frank, now Patent No. 2,766,450, which issued on October 9, 1956.

Since many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

What is claimed is:

1. An automatic loran receiver for indicating the time difference between received master and slave pulsed carrier signals, said receiver comprising means including a radio frequency amplifier for reproducing in amplified form the received pulsed carrier signals at the receiver; a detector responsive to the output of said amplifier for deriving the pulse envelopes of the received signals; derivative means coupled to the output of the detector for producing a derived form of the pulse envelopes having a zero cross-over point; a local oscillator having substantially the same frequency as the carrier of the received signals; a first servo loop including a frequency divider, a variable phase shifter coupling the output of the oscillator to the divider, a sampling gate coupled to the output of the derivative means, means for triggering the sampling gate in response to the output of the frequency divider, and means responsive to the output of the sampling gate for controlling the variable phase shifter to maintain the output of the frequency divider in fixed phase relation to the pulse envelopes of the master signal; a second servo loop including a sampling gate coupled to the output of the derivative means, means including a variable delay circuit responsive to the output of said frequency divider for triggering the sampling gate, and means responsive to the output of the sampling gate for controlling the variable delay circuit to maintain the output thereof in fixed phase relation to the pulse envelopes of the slave signal; a third servo loop including phase detector coupled to the output of the radio frequency amplifier, a variable phase shifter coupling a reference signal from the oscillator to the phase detector, a sampling gate coupled to the output of the phase detector and triggered in synchronism with the sampling gate in the first servo loop, and means responsive to the output of the sampling gate for controlling the phase shifter to maintain the output of the phase shifter phase coherent with the carrier of the received master signal; a fourth servo loop including a phase detector coupled to the output of the radio frequency amplifier, a variable phase shifter coupling a reference signal from the output of the phase shifter in the third servo loop to the phase detector, a sampling gate coupled to the output of the phase detector and triggered in synchronism with the sampling gate in the second servo loop, and means responsive to the output of the sampling gate for controlling the phase shifter to maintain the output of the phase shifter phase coherent with the carrier of the received slave signal; and calibrated means actuated in synchronism with the variable delay circuit in the second servo loop and with the phase shifter fourth servo loop for continuously indicating the time difference between the master and slave pulsed carrier signals.

2. An automatic loran receiver for indicating the time difference between received master and slave pulsed carrier signals, said receiver comprising means including a radio frequency amplifier for reproducing in amplified form the received pulsed carrier signals at the receiver, a detector responsive to the output of said amplifier for deriving the pulse envelopes of the received signals; a local oscillator having substantially the same frequency as the carrier of the received signals; a first servo loop including a frequency divider, a variable phase shifter coupling the output of the oscillator to the divider, a sampling gate coupled to the output of the pulse envelope deriving detector, means for triggering the sampling gate in response to the output of the frequency divider, and means responsive to the output of the sampling gate for controlling the variable phase shifter to maintain the output of the frequency divider in fixed phase relation to the pulse envelopes of the master signal; a second servo loop including a sampling gate coupled to the output of the pulse envelope deriving detector, means including a variable delay circuit responsive to the output of said frequency divider for triggering the sampling gate, and means responsive to the output of the sampling gate for controlling the variable delay circuit to maintain the output thereof in fixed phase relation to the pulse envelopes of the slave signal; a third servo loop including phase detector coupled to the output of the radio frequency amplifier, a variable phase shifter coupling a reference signal from the oscillator to the phase detector, a sampling gate coupled to the output of the phase detector and triggered in synchronism with the sampling gate in the first servo loop, and means responsive to the output of the sampling gate for controlling the phase shifter to maintain the output of the phase shifter phase coherent with the carrier of the received master signal; a fourth servo loop including a phase detector coupled to the output of the radio frequency amplifier, a variable phase shifter coupling a reference signal from the output of the phase shifter in the third servo loop to the phase detector, a sampling gate coupled to the output of the phase detector and triggered in synchronism with the sampling gate in the second servo loop, and means responsive to the output of the sampling gate for controlling the phase shifter to maintain the output of the phase shifter phase coherent with the carrier of the received slave signal; and calibrated means actuated in synchronism with the variable delay circuit in the second servo loop and the variable phase shifter fourth servo loop for continuously indicating the time difference between the master and slave pulsed carrier signals.

3. An automatic loran receiver for indicating the time difference between received master and slave pulsed carrier signals, said receiver comprising means including a radio frequency amplifier for reproducing in amplified form the received pulsed carrier signals at the receiver; a detector responsive to the output of said amplifier for deriving the pulse envelopes of the received signals; a local oscillator having substantially the same frequency as the carrier of the received signals; a first servo loop including a frequency divider, a variable phase shifter coupling the output of the oscillator to the divider, a sampling gate coupled to the output of the pulse envelope deriving detector, means for triggering the sampling gate in response to the output of the frequency divider, and means responsive to the output of the sampling gate for controlling the variable phase shifter to maintain the output of the frequency divider in fixed phase relation to the pulse envelopes of the master signal; a second servo loop including a sampling gate coupled to the output of the pulse envelope deriving detector, means including a variable delay circuit responsive to the output of said frequency divider for triggering the sampling gate, and means responsive to the output of the sampling gate for controlling the variable delay circuit to maintain the output thereof in fixed phase relation to the pulse envelopes of the slave signal; a third servo loop including a phase detector coupled to the output of the radio frequency amplifier, a variable phase shifter coupling a reference signal from the oscillator to the phase detector, and means responsive to the output of the phase detector for controlling the phase shifter to maintain the output of the phase shifter phase coherent with the carrier of the received master signal; a fourth servo loop including a phase detector coupled to the output of the radio frequency amplifier, a variable phase shifter coupling a reference signal from the output of the phase shifter in the third servo loop to the phase detector, and means responsive to the output of the phase detector for controlling the phase shifter to maintain the output of the phase shifter phase coherent with the carrier of the received slave signal; and calibrated means actuated by the second servo loop and the fourth servo loop for continuously indicating the time difference between the master and slave pulsed carrier signals.

4. An automatic loran receiver for indicating the time difference between received master and slave pulsed carrier signals, said receiver comprising means including a radio frequency amplifier for reproducing in amplified form the received pulsed carrier signals at the receiver; a detector responsive to the output of said amplifier for deriving the pulse envelopes of the received signals; a first servo loop including adjustable means for generating local pulses at substantially the repetition frequency of the received pulsed carrier signals, coincidence detecting means coupled to the output of said local pulse generating means and the output of the detector, and means responsive to the output of the coincidence detecting means for controlling the adjustable local pulse generating means to maintain the local pulses in fixed phase relation to the pulse envelopes of the received master signal; a second servo loop including variable pulse delay means coupled to the output of said local pulse generating means in the first servo loop, coincidence detecting means coupled to the output of the pulse delay means and the detector, and means responsive to the output of the coincidence detecting means for controlling the variable pulse delay means to maintain the output thereof in fixed phase relation to the pulse envelopes of the received slave signal; a third servo loop including a phase detector coupled to the output of the radio frequency amplifier, a variable phase shifter coupling a reference signal from the oscillator to the phase detector, and means responsive to the output of the phase detector for controlling the phase shifter to maintain the output of the phase shifter phase coherent with the carrier of the received master signal; a fourth servo loop including a phase detector coupled to the output of the radio frequency amplifier, a variable phase shifter coupling a reference signal from the output of the phase shifter in the third servo loop to the phase detector, and means responsive to the output of the phase detector for controlling the phase shifter to maintain the output of the phase shifter phase coherent with the carrier of the received slave signal; and calibrated means actuated by the second servo loop and the fourth servo loop for continuously indicating the time difference between the master and slave pulsed carrier signals.

5. An automatic tracking loran receiver responsive to master and slave pulsed carrier signals, comprising means for generating a first local signal of substantially the same frequency as the carrier of the received signals, first servo means for maintaining the frequency and phase of the first local signal in synchronism with the received master signals, means for generating a second local signal of substantially the same frequency as the carrier of the received signals, second servo means for maintaining the frequency and phase of the second local signal in synchronism with the received slave signals, means responsive to the first and second servos for indicating the relative phase displacement between the first and second local signals, means for generating a first pulsed signal at substantially the repetition frequency of the pulses of the received signals, third servo means for controlling the frequency and phase of the first pulsed signal in synchronism with the received master signals, means for generating a second pulsed signal at substantially the repetition frequency of the pulses of the received signals, fourth servo means for controlling the frequency and phase of the second pulsed signal in synchronism with the received slave signals, and means responsive to the third and fourth servos for indicating the relative phase displacement between the first and second local pulsed signals.

6. Apparatus as defined in claim 5 including means for gating on said first and second servo means in response to the first and second pulsed signals respectively.

7. An automatic tracking loran receiver responsive to master and slave pulsed carrier signals, comprising means for generating a first local signal of substantially the frequency of the carrier of the received signals, first means for controlling the first local signal in fixed phase relation with the received master signals, means for indicating the relative phase displacement between the first local signal and the carrier of the received slave signals, means for generating a pulsed signal at substantially the repetition frequency of the pulses of the received signals, means for controlling the pulsed signal in fixed phase relation with the envelope of the received master signals, and means for indicating the time delay between said pulsed signal and the received pulsed slave signal.

8. Apparatus as defined in claim 7 including means for gating on the first servo means in response to the first pulsed signal.

9. Receiving apparatus for measuring and indicating the time interval between a pair of received pulses of radio frequency energy at common carrier frequency, the pairs of pulses being received in groups at a predetermined repetition rate, said apparatus comprising means for generating groups of local triggers at substantially the repetition rate of the received pulse groups, means for varying the repetition rate of the groups of triggers in response to a control signal, means for varying the time interval between the pairs of triggers in each group in response to a control signal, means for synchronizing the triggers with the received pulses including pulse coincidence determining means responsive to the received pulses and the local triggers for generating first and second error signals indicative of the time relation between the respective received pulses and the corresponding local triggers and means responsive to said first and second error signals to provide first and second control signals for controlling respectively said means for varying the repetition rate of the groups of triggers and said means for varying the time interval between the pairs of triggers, means for generating a pair of local alternating current signals having substantially the same frequency as the carrier frequency of the received pulses, means for varying the apparent frequency of each of said local signals, means for varying the phase relation between said pair of local signals, means synchronizing the local alternating current signals with the carriers of the received pulses including phase comparator means responsive the carriers of the received pulses and said local signals for generating third and fourth error signals indicative of the phase relation between the respective carriers of the received pulses and the corresponding local alternating current signals and means responsive to said third and fourth error signals to provide third and fourth control signals for controlling respectively said means for varying the apparent frequency of said local alternating current signals and said means for varying the phase relation between the pair of local signals, means responsive to said means for varying the time relation between the triggers for indicating accurately said time interval, and means responsive to said means for varying the phase relation between said local signals for indicating accurately the said phase relation.

10. In a radio navigation system wherein master and slave pulses of radiant energy are respectively transmitted in known timed relationship from at least two fixed geographical positions, the radio frequency components of said pulses having a known phase relationship when transmitted, a receiver comprising means for measuring the time interval between the envelopes of received pulses, means for generating a continuous wave of said radio frequency having a fixed phase relative to the radio frequency component of pulses received from one of said transmitters, and means for detecting the phase displacement between said continuous wave and the radio frequency component of the other of said pulses during the period of reception of said latter pulse, thereby affording a second measure of the time difference between reception of said pulses of a substantially higher order of accuracy than said first measure, whereby both coarse and fine measurements of the time interval between received energy waves are obtainable.

No references cited.